(12) United States Patent
Liles

(10) Patent No.: US 7,063,188 B1
(45) Date of Patent: Jun. 20, 2006

(54) TREE SEAT

(76) Inventor: Dale L. Liles, 11174 Swallow Blvd., Eldon, IA (US) 52554

( * ) Notice: Subject to any disclaimer, the term of this patent is extended or adjusted under 35 U.S.C. 154(b) by 0 days.

(21) Appl. No.: 10/853,049

(22) Filed: May 25, 2004

(51) Int. Cl.
*E04G 3/00* (2006.01)
(52) U.S. Cl. ............ 182/187; 182/135; 182/136; 182/134; 182/188; 403/109.6
(58) Field of Classification Search ......... 297/4, 297/16.1, 256.16, 352, 217.7, 195.11; 182/187, 182/135, 136, 134; 403/109.6
See application file for complete search history.

(56) References Cited

U.S. PATENT DOCUMENTS

| 2,711,783 | A | | 6/1955 | Prill | |
| 4,124,094 | A | | 11/1978 | Cande | |
| 4,161,233 | A | | 7/1979 | Wirtz | |
| 4,225,013 | A | * | 9/1980 | Sample | 182/134 |
| 4,337,844 | A | | 7/1982 | Hice, Sr. | |
| 4,605,094 | A | * | 8/1986 | Minerd | 182/20 |
| 4,723,630 | A | * | 2/1988 | Wolford et al. | 182/134 |
| 4,726,447 | A | * | 2/1988 | Gibson et al. | 182/135 |
| 4,776,503 | A | | 10/1988 | Sink | |
| 4,928,793 | A | | 5/1990 | Westimayer et al. | |
| 4,987,972 | A | * | 1/1991 | Helms | 182/187 |
| 4,989,766 | A | * | 2/1991 | Lewallyn et al. | 224/155 |
| 4,997,063 | A | | 3/1991 | Bradley | |
| 5,009,283 | A | * | 4/1991 | Prejean | 182/116 |
| 5,052,516 | A | * | 10/1991 | Jamieson | 182/135 |
| 5,103,935 | A | * | 4/1992 | Amacker | 182/187 |
| 5,265,780 | A | * | 11/1993 | Matthews et al. | 224/155 |
| 5,285,868 | A | * | 2/1994 | Amacker | 182/134 |
| 5,332,063 | A | * | 7/1994 | Amacker | 182/116 |
| 5,379,861 | A | * | 1/1995 | Amacker | 182/187 |
| 5,524,956 | A | * | 6/1996 | Moore | 297/4 |
| D379,235 | S | | 5/1997 | Jones | |
| 5,842,540 | A | * | 12/1998 | Mancini, Jr. | 182/136 |
| 5,979,603 | A | * | 11/1999 | Woller | 182/187 |
| 6,173,671 | B1 | * | 1/2001 | Casull | 114/345 |
| 6,308,800 | B1 | * | 10/2001 | Graham, Jr. | 182/136 |
| 6,345,690 | B1 | * | 2/2002 | Morris | 182/136 |
| 6,397,973 | B1 | * | 6/2002 | Woller | 182/187 |
| 6,715,585 | B1 | | 4/2004 | Overbaugh | |

* cited by examiner

*Primary Examiner*—Peter M. Cuomo
*Assistant Examiner*—Erika Garrett
(74) *Attorney, Agent, or Firm*—McKee, Voorhees & Sease, P.L.C.

(57) ABSTRACT

An L-shaped tree seat frame includes a forward leg and a side leg on which a rear leg is slidably mounted and limited against relative rotation by cooperating rib and groove deformations in the sleeve of the rear leg and the top wall of the tubular side leg. Foam material filling the side leg includes pin passageways for guiding a locking pin through the sleeve and selected aligned openings in the side leg. The seat includes three spaced apart fingers which allow for a person's hand to grasp a center finger and balance the tree seat while the person's other hand positions the rear leg against the back side of a tree for locking the tree seat to a tree.

7 Claims, 6 Drawing Sheets

TREE SEAT

BACKGROUND OF THE INVENTION

Tree seats are important to people who spend extended periods of time outdoors including hunters and bird watchers. Known tree seats are intended to fit around a tree of only one size and are awkward to hold while mounting on a tree. Conventional tree seats utilizing a C-shape frame will require a chain, wire or some other closure element extending between the spaced apart frame ends such that the tree is fully embraced by the tree seat.

A tree seat is needed that is adjustable to fit a wide variety of trees of different sizes and does not need to extend fully around the trunk of the tree to hold the seat firmly during use.

SUMMARY OF THE INVENTION

The tree seat of this invention includes an L-shape frame having a forward leg and a side leg with an adjustable rear leg slidably connected to the side leg thus allowing the tree seat to be mounted on trees of varying diameters. An anchor blade is provided on the forward side of the rear leg for biting into the bark of the tree thereby stabilizing the tree seat without the need of a closure element extending between the front and rear legs on the side of the tree opposite the side leg.

The rear leg includes a sleeve which receives the tubular side leg for adjustable positioning of the rear leg against the back side of the tree.

Cooperating longitudinally extending rib and groove indentations are formed in the top walls of the sleeve and the side leg to limit relative pivotal movement of the rear leg on the side leg while allowing for forward and rearward adjustment of the rear leg on the side leg. A plurality of spaced apart holes are formed in the groove in the side leg for selective locking alignment with aligned holes in the top and bottom walls of the sleeve. The tube of the side leg is filled with foam material which includes passageways extending between the aligned top and bottom wall openings to provide a guide for a locking pin extending through the sleeve and the side leg.

The seat is formed from a U-shaped tubular member having its free ends connected to the forward face of the front leg and a center finger extends from the front leg between the fingers of the U-shaped tubular member and thereby provide space on either side of the center finger for a person's hand to grasp and balance the tree seat with one hand while the other hand holds the adjustable rear leg when mounting the tree seat on a tree.

The tubular fingers of the seat are covered with cushion material in turn having external camouflage for obscuring the tree seat in the environment of use.

DETAILED DESCRIPTION OF THE PREFERRED EMBODIMENT

Figure 1:
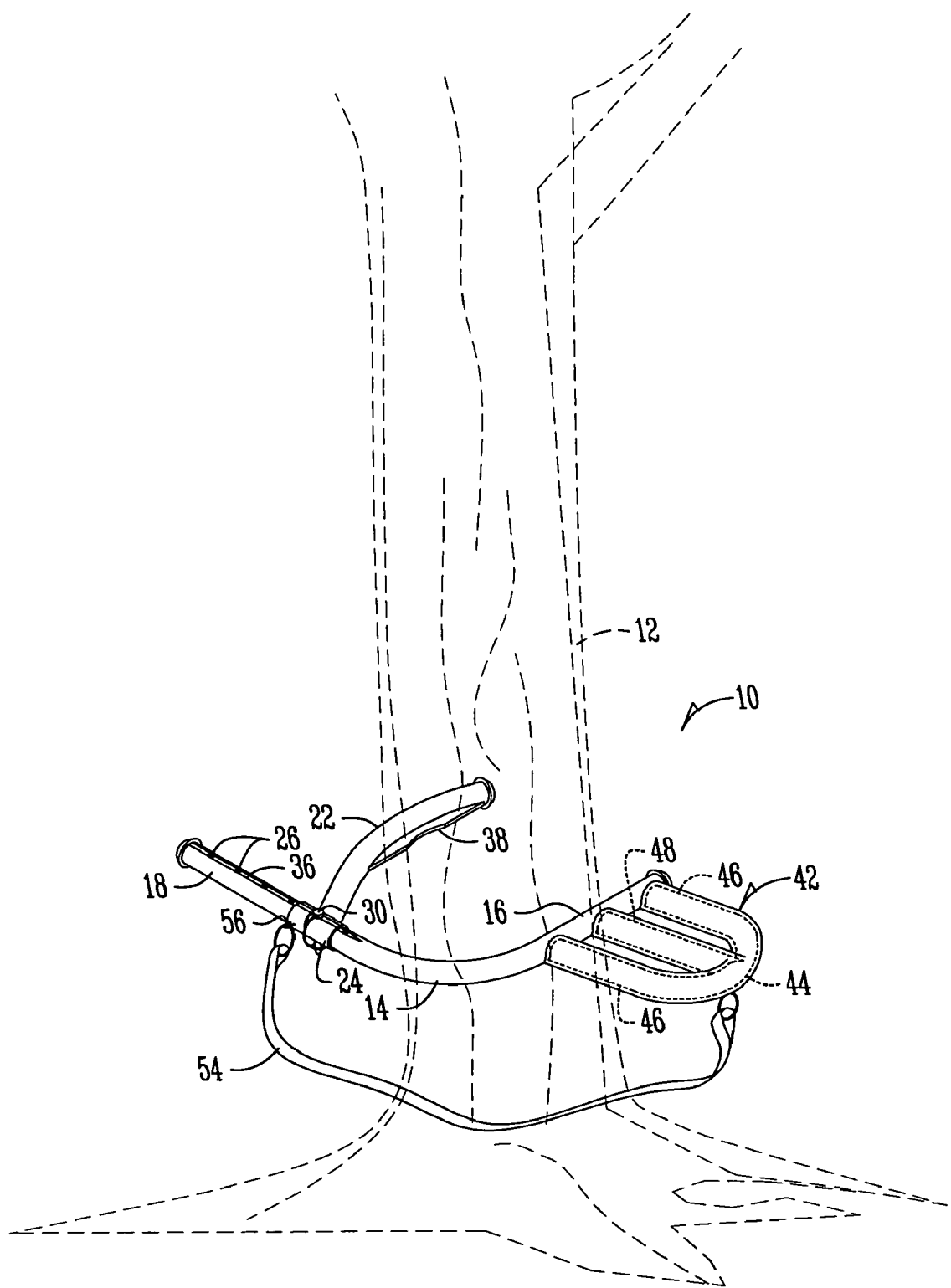
FIG. 1 is a front perspective view of the tree seat of this invention mounted on a tree.
Figure 2:
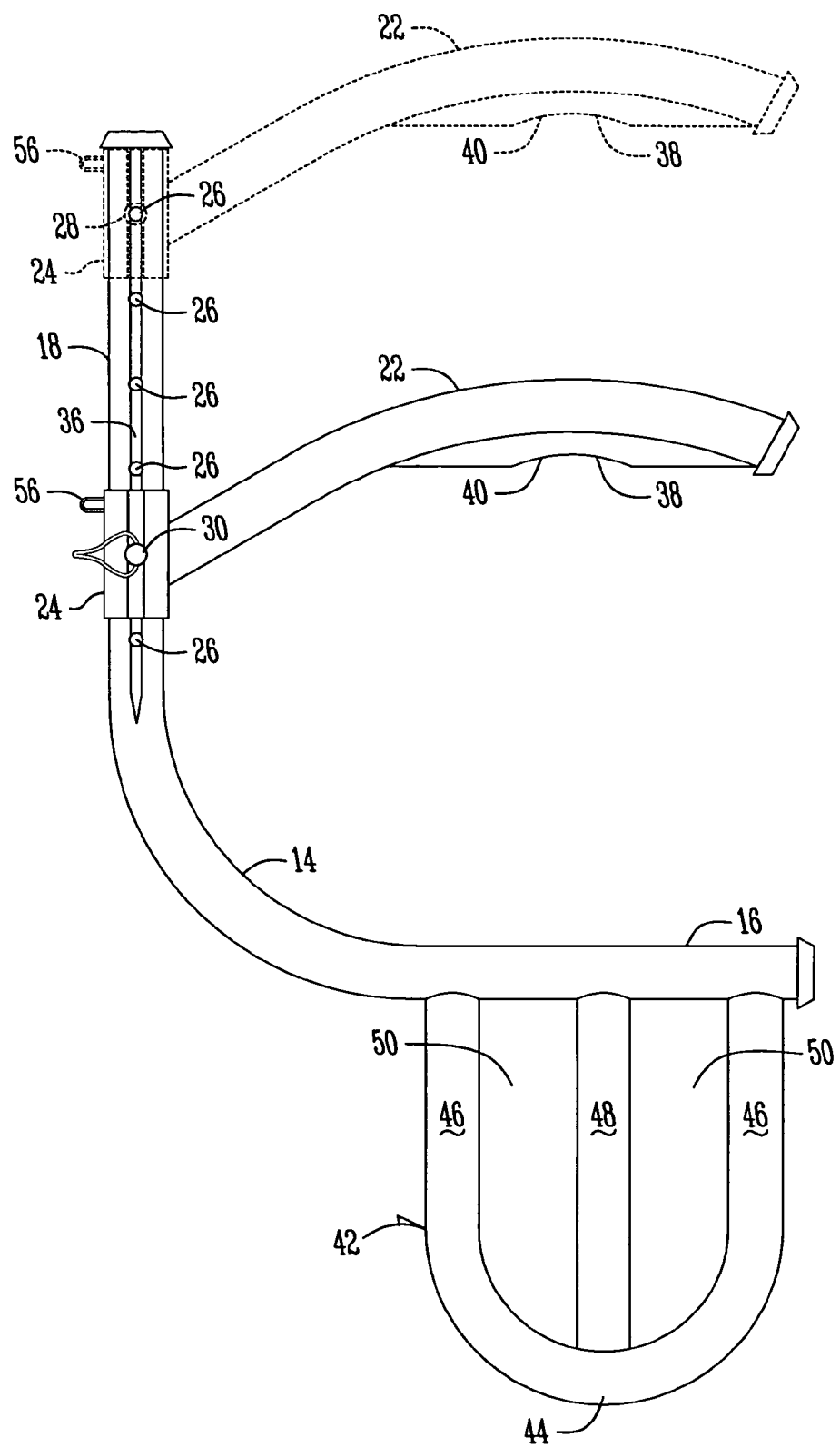
FIG. 2 is a top plan view of the tree seat showing the rear leg in different positions of use.
Figure 3:
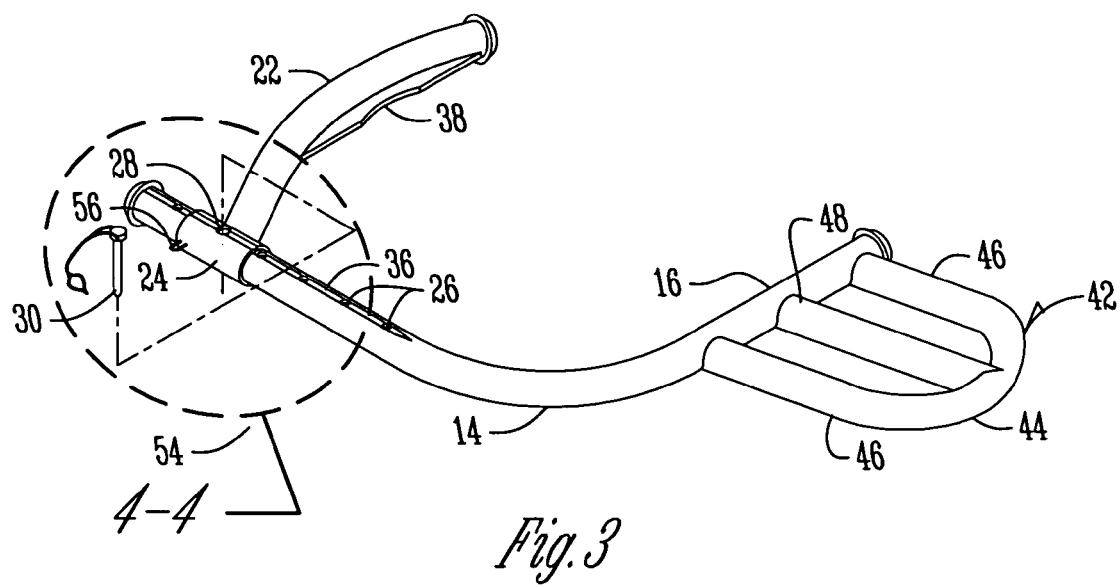
FIG. 3 is a front perspective view of the tree seat.

The tree seat of this invention is referred to generally by the reference numeral 10 in FIG. 1 and is shown mounted on a tree 12.

Figure 4:
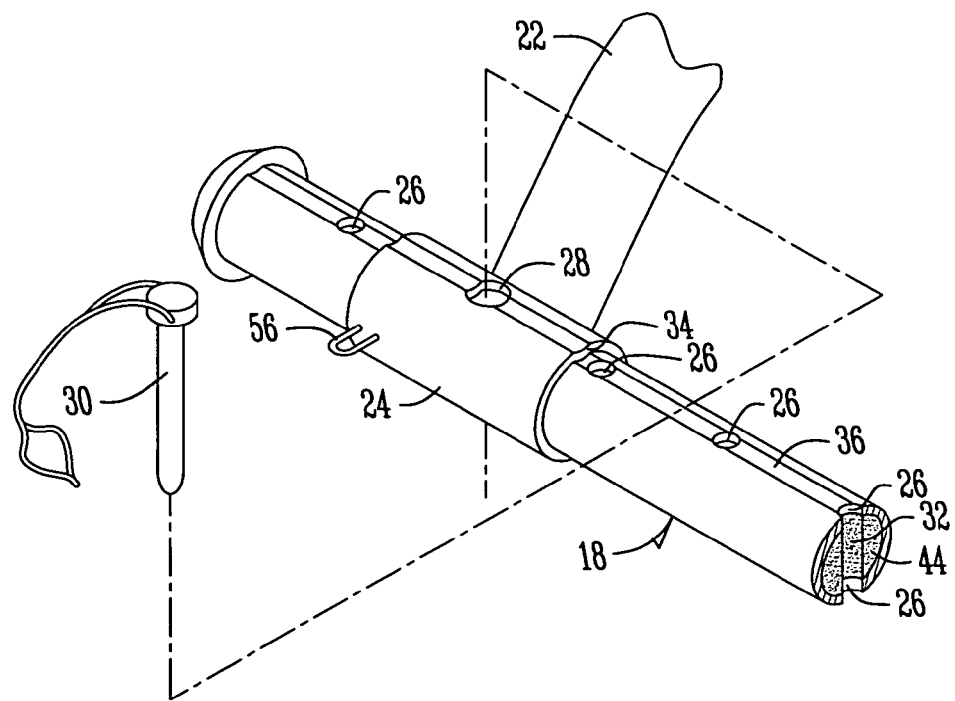
FIG. 4 is an enlarged view of the rear leg sleeve slidably adjustable on the side leg within line 4—4 in FIG. 3.

The tree seat 10 includes an L-shaped frame having a front leg 16 and a side leg 18 of tubular construction and filled with foam 20 as seen in FIG. 4. An adjustable rear leg 22 includes a sleeve 24 slidably mounted on the side leg 18. A series of longitudinally spaced apart vertically aligned openings 26 are provided in the top and bottom sides of the side leg for selective alignment with top and bottom openings 28 in the sleeve 24. A pin 30 is adapted to be positioned in the selected aligned openings 26 and 28. The guide passageway 32 is formed in the foam material 20 permitting easy insertion of the pin 30 through and between the top and bottom openings 26 in the tubular side leg.

The rear leg 22 is prevented from pivoting on the side leg 18 by cooperating rib 34 and groove 36 deformations formed in the top side wall of the sleeve 24 and the top side wall of the tubular side leg 18.

The tree seat 10 is stabilized on a tree without the need of a wire, chain or other closure element extending between the front leg 16 and the outer end of the adjustable rear leg 22. This stabilization is in a large part made possible by the use of an anchor blade 38 mounted on the forward face of the adjustable rear leg 22. The anchor blade includes an arcuate bite edge 40 for conforming to the rounded curvature of the tree surface.

Figure 6:
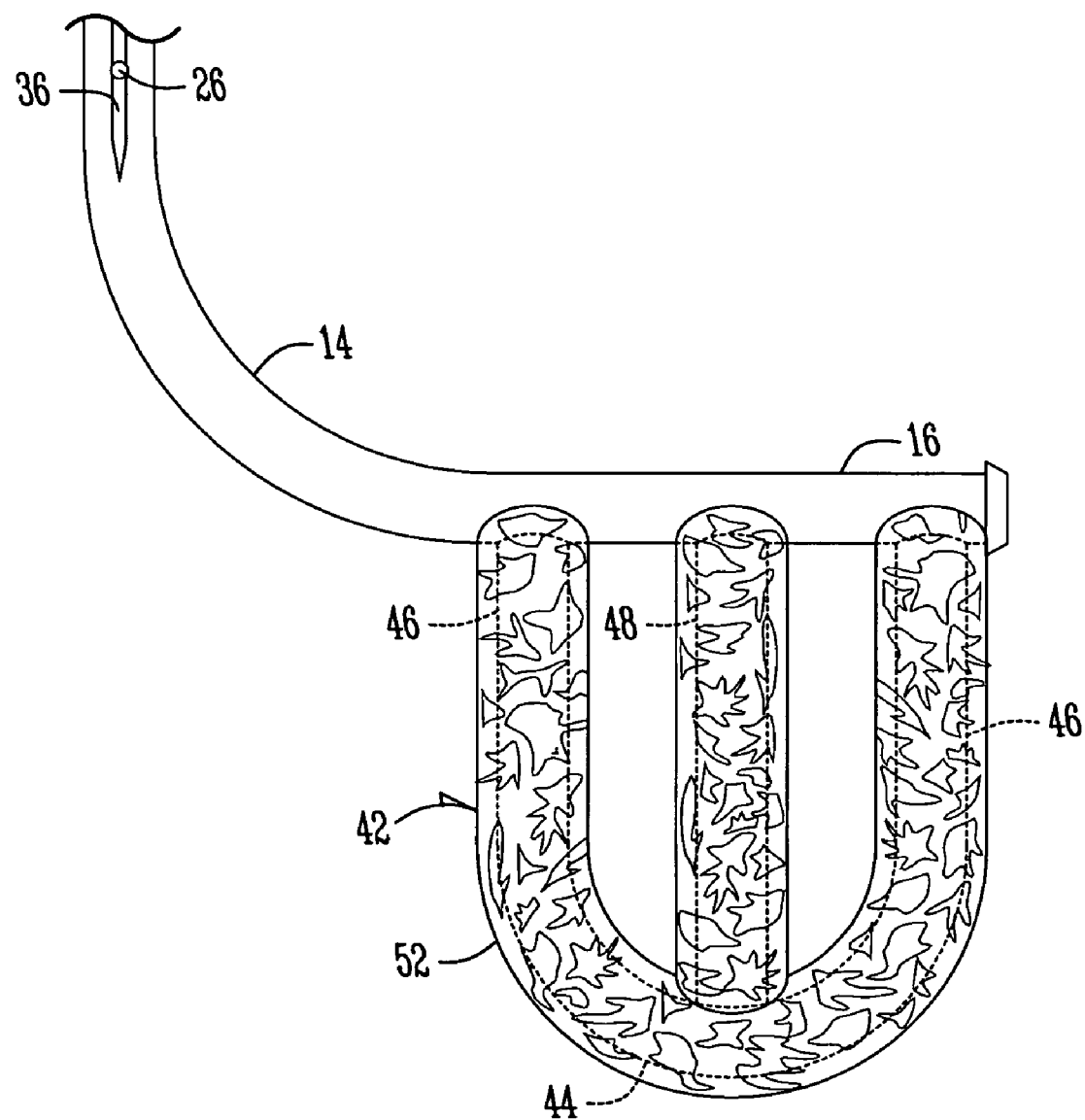
FIG. 6 is a fragmentary top plan view showing in greater detail the construction of the seat including tubular elements covered with cushion material.

The tree seat 10 also includes a seat 42 formed from a U-shaped tubular member 44 having oppositely disposed side fingers 46 between which a center tubular finger 48 is provided leaving space between the center finger 48 and the side fingers 46. As seen in FIG. 6, the tubular fingers 46 and 48 of the seat 42 are covered with cushion material 50 which in turn includes external camouflage to obscure the tree seat in the environment of use. The camouflage may be provided on an outer fabric wrap 52 as seen in FIG. 6.

Figure 5:
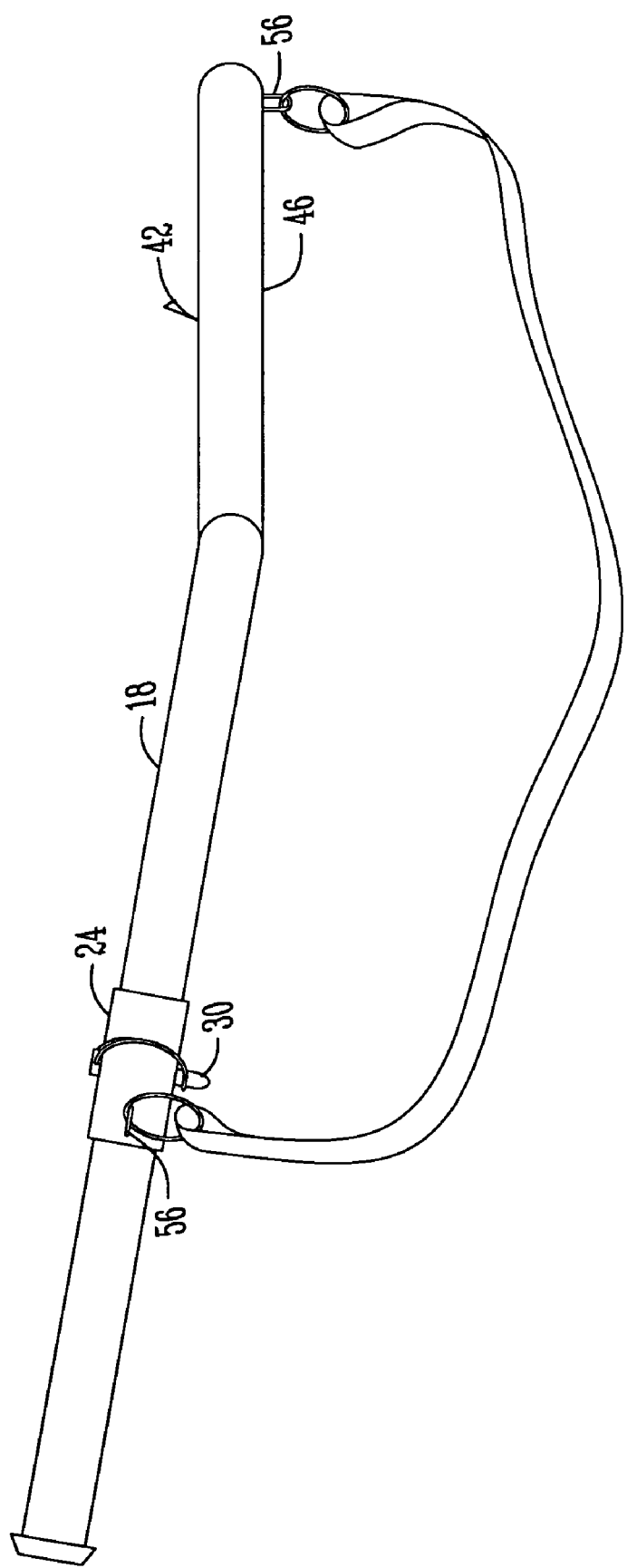
FIG. 5 is a side elevational view of the tree seat as it would appear if mounted on a tree.

A carrying strap 54 has its opposite ends connected to hook eyes 56 on the rear leg sleeve 24 and the forward bottom side of the seat 42 as seen in FIG. 5.

Figure 7:
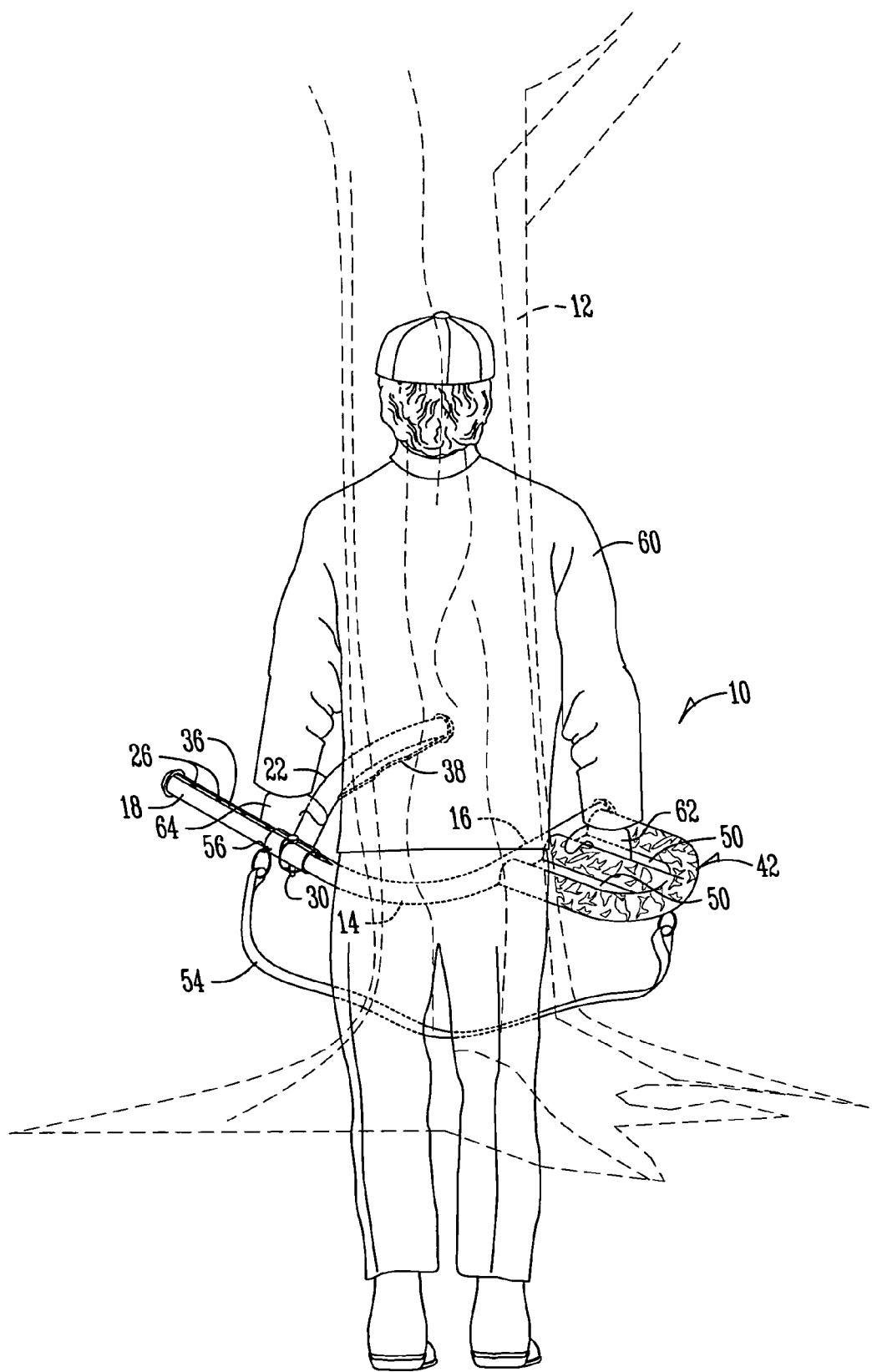
FIG. 7 is a front elevational view illustrating a person grasping the seat center finger of the seat in one hand and the tree seat rear leg in the other hand while adjustably positioning the tree seat on a tree.

In use as seen in FIG. 7, a person 60 holds the tree seat 10 with one hand 62 grasping the center finger 48 with his fingers received in the space 50 between the center finger 48 and the side fingers 46. The person's other hand 64 holds the rear leg 22 on the back side of the tree 12 and adjusts the rear leg 22 forwardly with the anchor blade 40 becoming lockingly engaged with the bark of the tree 12. The cushioning 50 on the seat fingers 46 and 48 provide a comfortable seat for extended periods of use.

Thus it is seen that an inexpensive tree seat is provided that is easily balanced in one hand and quickly adjustably mounted on a tree with the other hand.

What is claimed is:

1. A tree seat, comprising:
   an L-shaped frame including a front leg and a side leg adapted to engage the front and one side of a tree;

an adjustable rear leg moveably mounted on said side leg for adjustably engaging the back side of trees of different sizes;

a forwardly extending seat secured to said front leg of said L-shaped frame;

said adjustable rear leg including a sleeve which receives said side leg and locking means for selectively locking said rear leg to said side leg;

said sleeve and side leg having cooperating rib and groove means for limiting pivotal movement of said adjustable rear leg on said side leg;

said side leg being tubular and including top and bottom wall portions each of said wall portions horizontally including longitudinally spaced apart aligned openings in said groove in said side leg, and said sleeve including top and bottom wall portions having vertically aligned openings, and a pin extending through said sleeve aligned openings and selectively through aligned openings in said side leg to limit relative longitudinal movement between said adjustable rear leg and said side leg; and said tubular side leg being filled with foam material including a series of vertical pin passageways in alignment with said aligned openings in said tubular side thereby providing a guide for said pin through said tubular side leg.

2. The tree seat of claim 1 wherein said sleeve includes a top wall having a rib deformed downwardly received in said groove in a top wall of said side leg with said groove being deformed downwardly in the top wall of said side leg.

3. The tree seat of claim 1 wherein said opening in the top wall portion of said sleeve is positioned in said rib deformed out of said sleeve top wall portion.

4. The tree seat of claim 1 wherein said adjustable rear leg includes front and rear side portions, and a forwardly extending anchor blade is provided on the front side portion of said adjustable rear leg to lockingly engage the bark of a tree.

5. The tree seat of claim 1 wherein said forwardly extending seat includes a plurality of spaced apart parallel fingers which provide space therebetween for a person's hand when holding the seat in one hand and the adjustable rear leg in the other hand while positioning the tree seat on a tree.

6. The tree seat of claim 1 wherein said seat parallel fingers are tubular and are formed by a U-shaped element providing first and second finger and a third finger is centrally positioned therebetween thereby providing hand space on opposite sides of said third finger between said first and second fingers.

7. The tree seat of claim 6 wherein said seat tubular finger elements are wrapped with cushion material.

* * * * *